(12) United States Patent
Alvarez et al.

(10) Patent No.: US 11,138,449 B2
(45) Date of Patent: Oct. 5, 2021

(54) OBSTACLE REPRESENTATION DISPLAY

(71) Applicant: Intel Corporation, Santa Clara, CA (US)

(72) Inventors: Ignacio Alvarez, Portland, OR (US); Fabricio Novak, Hillsboro, OR (US); Marina Tereza Weishaupt Strano, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 16/145,192

(22) Filed: Sep. 28, 2018

(65) Prior Publication Data
US 2019/0050651 A1   Feb. 14, 2019

(51) Int. Cl.
*G06K 9/00* (2006.01)
*G06F 3/0484* (2013.01)
*G06T 7/11* (2017.01)
*G06K 9/32* (2006.01)

(52) U.S. Cl.
CPC ..... *G06K 9/00805* (2013.01); *G06F 3/04845* (2013.01); *G06K 9/3241* (2013.01); *G06T 7/11* (2017.01)

(58) Field of Classification Search
CPC combination set(s) only.
See application file for complete search history.

(56) References Cited

U.S. PATENT DOCUMENTS

| | | | | |
|---|---|---|---|---|
| 6,567,068 B2* | 5/2003 | Rekimoto | .......... | G01C 21/3635 345/156 |
| 7,656,393 B2* | 2/2010 | King | .......... | G06F 3/04886 345/173 |
| 8,013,889 B1* | 9/2011 | Hong | .......... | B60R 11/04 348/148 |
| 8,740,426 B2* | 6/2014 | Jones | .......... | G01D 13/28 362/489 |
| 9,333,915 B2* | 5/2016 | Nakanishi | .......... | E02F 9/261 |
| 9,487,139 B1* | 11/2016 | Ishida | .......... | B60W 30/08 |
| 10,723,264 B2* | 7/2020 | Fujisawa | .......... | B60Q 3/78 |
| 2001/0008992 A1* | 7/2001 | Saito | .......... | G01S 11/12 701/301 |
| 2001/0039474 A1* | 11/2001 | Hayashi | .......... | G01C 21/3673 701/436 |
| 2008/0137012 A1* | 6/2008 | Louwsma | .......... | G02F 1/133512 349/106 |

(Continued)

OTHER PUBLICATIONS

Gugerty, Leo; "Situation Awareness in Driving", Handbook of Driving Simulation for Engineering, Medicine and Psychology, Jan. 2011, CRC Press Boca Roca, FL, pp. 265-272.

(Continued)

*Primary Examiner* — Zhiyu Lu
(74) *Attorney, Agent, or Firm* — Viering, Jentschura & Partner mbB

(57) ABSTRACT

Herein is disclosed a set of instructions, configured to cause one or more processors to receive data representing one or more parameters of an obstacle relative to a vehicle; generate a visual representation of the one or more parameters; and instruct a display controller to display a composite image, the composite image comprising a content image within an inner region of a display and the visual representation within an outer region of the display.

19 Claims, 11 Drawing Sheets

(56) References Cited

U.S. PATENT DOCUMENTS

| | | | | |
|---|---|---|---|---|
| 2008/0297591 A1* | 12/2008 | Aarts | ............ | H04N 5/74 348/51 |
| 2008/0309762 A1* | 12/2008 | Howard | ............ | G07C 5/0891 348/148 |
| 2009/0171529 A1* | 7/2009 | Hayatoma | ............ | B60K 35/00 701/36 |
| 2010/0117960 A1* | 5/2010 | Huntzicker | ............ | G06F 3/04812 345/158 |
| 2010/0164706 A1* | 7/2010 | Jeng | ............ | B60Q 9/007 340/459 |
| 2010/0201508 A1* | 8/2010 | Green | ............ | G08G 1/165 340/435 |
| 2011/0018849 A1* | 1/2011 | Lowe | ............ | G09G 5/003 345/205 |
| 2011/0080348 A1* | 4/2011 | Lin | ............ | G06F 1/1626 345/173 |
| 2012/0154591 A1* | 6/2012 | Baur | ............ | B60R 1/00 348/148 |
| 2012/0319828 A1* | 12/2012 | Krauss | ............ | B62D 1/046 340/425.5 |
| 2013/0010117 A1* | 1/2013 | Miyoshi | ............ | B60R 1/002 348/148 |
| 2014/0176321 A1* | 6/2014 | Chen | ............ | B60W 30/14 340/435 |
| 2014/0267973 A1* | 9/2014 | Shinojima | ............ | G02F 1/133512 349/58 |
| 2016/0055827 A1* | 2/2016 | Hamada | ............ | H04M 1/72403 345/659 |
| 2016/0086042 A1* | 3/2016 | Enz | ............ | G06K 9/00805 348/148 |
| 2016/0288709 A1* | 10/2016 | Nespolo | ............ | B60K 35/00 |
| 2016/0332569 A1* | 11/2016 | Ishida | ............ | B60W 30/09 |
| 2017/0011709 A1* | 1/2017 | Kuwabara | ............ | G06T 11/001 |
| 2017/0069212 A1* | 3/2017 | Miyazawa | ............ | G08G 1/16 |
| 2017/0088053 A1* | 3/2017 | Orellana | ............ | B60R 1/12 |
| 2017/0124887 A1* | 5/2017 | Hornych | ............ | G01S 7/6218 |
| 2017/0151910 A1* | 6/2017 | Sato | ............ | B60R 1/00 |
| 2017/0176950 A1* | 6/2017 | Jung | ............ | G04B 19/225 |
| 2017/0206831 A1* | 7/2017 | Schmittat | ............ | B60K 37/04 |
| 2017/0349173 A1* | 12/2017 | Nishiguchi | ............ | B62D 15/0255 |
| 2018/0011551 A1* | 1/2018 | Gothlin | ............ | G06F 3/016 |
| 2018/0031831 A1* | 2/2018 | Iwase | ............ | G02B 27/01 |
| 2018/0046869 A1* | 2/2018 | Cordell | ............ | G06K 9/00845 |
| 2018/0108147 A1* | 4/2018 | Kim | ............ | G06F 3/0308 |
| 2018/0211527 A1* | 7/2018 | Ishihara | ............ | H04W 4/026 |
| 2018/0308359 A1* | 10/2018 | Hayakawa | ............ | G08G 1/144 |
| 2019/0143888 A1* | 5/2019 | Schaye | ............ | B60Q 1/2661 315/79 |
| 2019/0206250 A1* | 7/2019 | Nemeth | ............ | G08G 1/09626 |
| 2020/0043381 A1* | 2/2020 | Tsukamoto | ............ | H01L 51/003 |

OTHER PUBLICATIONS

NHTSA; Distracted Driving; US Department of Transportation; 2018; 8 pages.

WHO; Road traffic crashes leading cause of death among young people; 2007; 4 pages.

Youtube; Uber Crash in Tempe; Mar. 21, 2018; (https://www.youtube.com/watch?v=P243yeOnKoo).

SAE International, "Human Factors Definitions for Automated Driving and Related Research Topics", Surface Vehicle Information Report, J3114, Dec. 2016, 60 Pages.

\* cited by examiner

OBSTACLE REPRESENTATION DISPLAY

TECHNICAL FIELD

Various aspects of the disclosure relate generally to the depiction of obstacle-factors during autonomous driving.

BACKGROUND

As autonomous driving technology is developed, vehicles are able to assume control of ever more functions within a vehicle. Although vehicles are able to control many aspects of driving, complete and sustained autonomous driving, without any need for occupant input, is not yet a reality. Rather, even where the vehicle may generally assume the driving responsibilities, the vehicle may encounter a situation of complexity that exceeds the vehicle's autonomous driving capabilities. In this circumstance, the known solution is to alert the driver and instruct the driver to assume driving responsibilities from the vehicle.

During periods of driver inactivity, such as periods when the autonomous vehicle is able to assume the driving responsibilities, the driver will ideally remain attentive to the surroundings and the driving requirements. It is assumed, however, that at least some drivers will not maintain sustained attention to the vehicle's surroundings and driving responsibilities during periods of autonomous vehicle driving. For example, it may be reasonable to assume that some passengers will divert their attention from the driving responsibilities to a handheld device or a vehicle entertainment system. When the attention is directed to such systems, the occupant may become unaware of the surroundings and the driving responsibilities, and therefore the occupant may be less able to rapidly assume control of the vehicle.

SUMMARY

Herein is disclosed a set of instructions, configured to cause one or more processors to receive data representing one or more parameters of an obstacle relative to a vehicle; generate a visual representation of the one or more parameters; and instruct a display controller to display a composite image, the composite image comprising a content image within an inner region of a display and the visual representation within an outer region of the display.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 2:
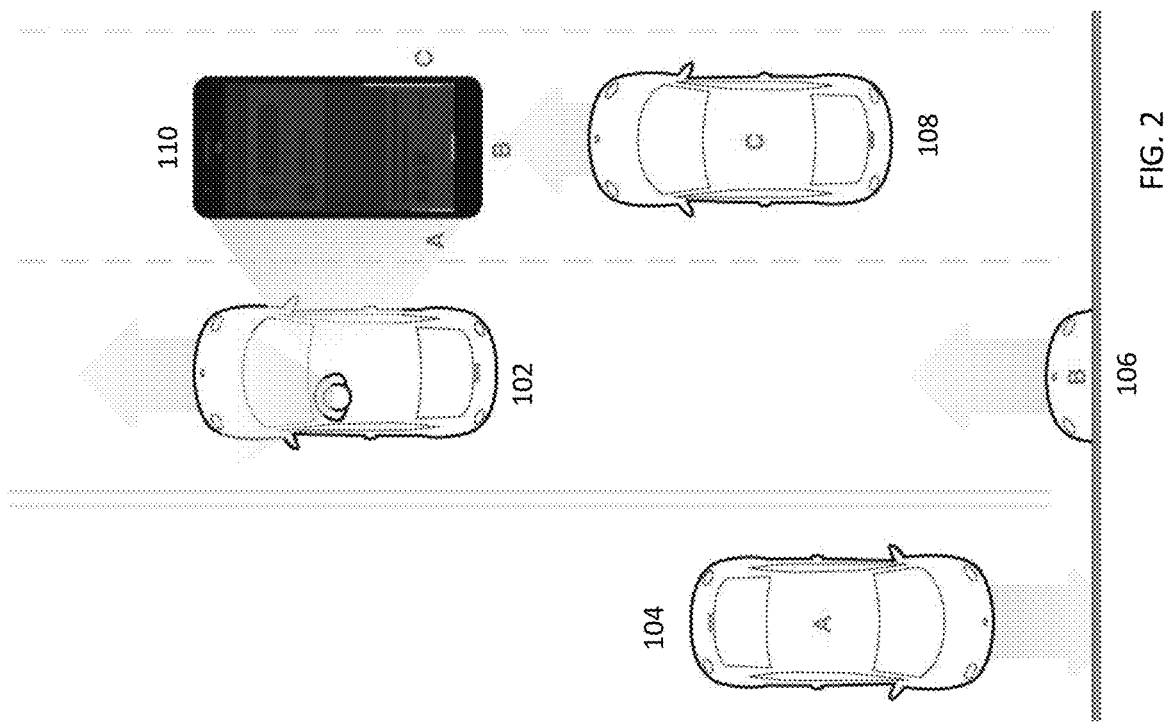
FIG. 2 shows an additional example of vehicle surroundings depiction.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

The term "circuit" may be understood as any kind of a logic implementing entity, which may be special purpose circuitry or a processor executing software stored in a memory, firmware, or any combination thereof. Thus, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java.

Any other kind of implementation of the respective functions which will be described in more detail below may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "position" or used herein with regard to a "position of an object", "position of an obstacle", and the like, may be used herein to mean a point in a two- or three-dimensional space. The term "location" and the like, may be used herein to mean a spatial region in a two- or three-dimensional space. It is understood that suitable coordinate systems (e.g., a geolocational coordinate system) with respective reference points are used to describe positions, vectors, movements, and the like.

The term "obstacle" may refer to any object within a vicinity of a vehicle, regardless of trajectory. That is, an obstacle may be static or dynamic, and where dynamic, the obstacle may be travelling toward the vehicle, away from the vehicle, or parallel to the vehicle. An obstacle may include an object, a vehicle, a person, an animal, or otherwise.

An autonomous ground vehicle (AGV) is a ground vehicle that has the capability of ground-based autonomous motion. In autonomous motion, a human pilot (also referred as to driver) is not in control of the AGV. The autonomous motion may be provided in an autonomous operation mode of the AGV. However, in the autonomous operation mode of the autonomous ground vehicle, one or more passengers may be aboard the autonomous ground vehicle, but not in control of the autonomous ground vehicle. If a passenger takes over control of the autonomous ground vehicle (than also referred as to the human pilot), the autonomous ground vehicle may enter the manual operation mode, e.g., manual driving mode. For example, the autonomous ground vehicle may be switched into the manual operation mode in response to a passenger acting on the steering wheel, or commanding otherwise. The AGV may be a self-driving vehicle, e.g., car. The AGV being free of any passenger (including the human pilot), may be unoccupied. The unoccupied AGV may also be denoted as unstaffed or uninhabited ground vehicle.

Although current AGVs may be able to drive autonomously for lengths of time, AGVs still require human drivers to occasionally assume driving responsibilities, such as when the vehicle encounters situations of complexity beyond the vehicle's ability. Because a driver may be called upon at any time to assume driving responsibilities from the AGV, it is theoretically necessary for the driver to maintain sustained attention to the AGV's surroundings, the traffic patterns, and any potential obstacles or hazards. Maintaining such sustained attention to the environment presumably permits the human occupant to assume driving responsibilities more rapidly and readily than if the human occupant is unaware of the surroundings at the time that driving responsibilities are transferred.

Despite the importance of maintaining awareness of the vehicle's surroundings during periods of autonomous driving, it is anticipated that at least some drivers will divert their attention from the vehicle's surroundings to a screen or device, such as a smart phone or vehicle infotainment system. Such devices typically display user content, which may eventually attract most or all of the occupant's attention, thereby preventing the vehicle occupant from being aware of the surroundings prior to the point the driving responsibilities are transferred.

Various efforts have been used to prevent drivers from engaging with smart phones or screens during the driving experience, such as smart phone block out applications or systems that prohibit user content from being displayed while the vehicle is being operated. However, such features require occupant participation, such as the occupant deciding not to engage in screen use. Where the occupant decides to view user content on a screen or smart phone during an autonomous driving experience, these known applications are of limited consequence.

To the extent that an occupant decides to engage in screen or smart phone use during a period of autonomous driving, the occupant's attention to the vehicle's surroundings may be increased by providing information or cues of the vehicle's surroundings or other driving factors on the screen or smart phone on which the occupant views user content. Otherwise stated, it is desired to display information about a vehicle's surroundings, including but not limited to traffic patterns, proximity of other vehicles, hazards posed by other vehicles, criticality of driving situations, and the like, on a screen or smart phone on which user content is also displayed.

Figure 1:
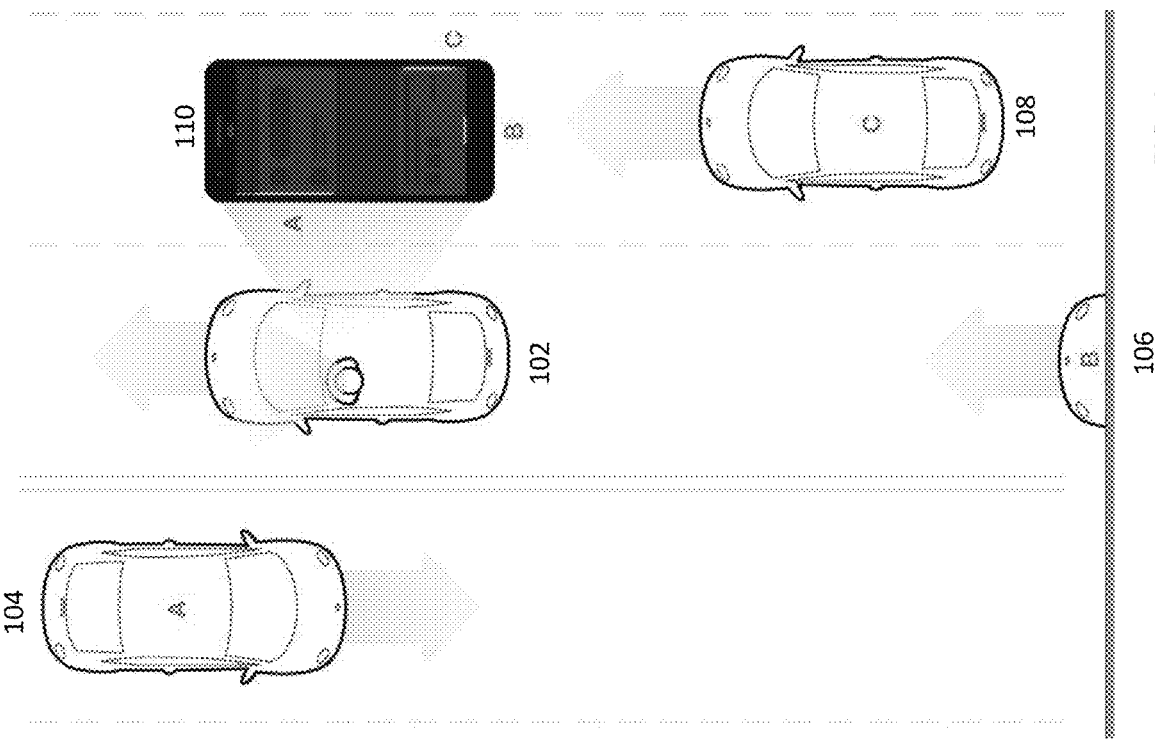
FIG. 1 shows a depiction of vehicle surroundings according to an aspect of the disclosure.

FIG. 1 shows a depiction of vehicle surroundings according to an aspect of the disclosure. Occupant vehicle 102 is traveling in the left lane of a roadway going a first direction. Vehicle 104 is traveling in a leftmost lane of a roadway going a second and opposite direction. Vehicle 106 is traveling behind the occupant vehicle 102, and vehicle 108 is traveling in direction of the occupant vehicle 102 in an adjacent lane to the right of occupant vehicle 102. Occupant vehicle 102 is being driven autonomously, and the occupant in occupant vehicle 102 is utilizing a smart phone 110, on which user content is being displayed, as well as information about the vehicle's surroundings.

Vehicle 104 is marked within 'A', and the corresponding image on smart phone 110 is also marked with an 'A'. Because vehicle 104 is approaching the occupant vehicle 102 from the front of occupant vehicle 102, a line representing an aspect of vehicle 104 is shown toward the front or top portion of the smart phone 110. As will be described herein, the line may vary in length, thickness, pattern, or movement to reflect aspects of the movement of vehicle A 104, such as velocity, acceleration, directionality, proximity, or criticality. In this case, line 'A', for example, occupies nearly one half of the left edge of the screen, indicating a close proximity of the vehicle.

Similarly, vehicle 106 is approaching occupant vehicle 102 from behind. A corresponding mark on the cell phone 'B' corresponds to an aspect of vehicle 106. In this case, an aspect of the movement of vehicle 'B' 106 is depicted on the bottom of smart phone 110 to reflect that vehicle 106 is approaching occupant vehicle 102 from behind. Because there is significant distance between vehicle 106 and vehicle 102, the line at section 'B' of the smart phone 110 is comparatively small. According to one aspect of the disclosure, as the distance between vehicle 106 and vehicle 102 decreases, the line corresponding to 'B' on smart phone 110 increases. Finally, vehicle 108 is approaching the occupant vehicle 102 from the left side and from behind. As such, the corresponding indication on the smart phone 110 is labeled as mark 'C', which is depicted as a line on the bottom right-hand portion of the smart phone 110, thereby corresponding to the direction and location of the vehicle 108. As will be described in greater detail herein, the length, thickness, color, pattern, brightness, and movement of the lines may be determined to reflect one or more aspects of the corresponding vehicle.

FIG. 2 shows an additional example of vehicle surroundings depiction, based on movement of vehicles as depicted in FIG. 1. In this case, vehicle 104 has moved from being in front of occupant vehicle 102 to being behind occupant vehicle 102. As such, the marking 'A' has moved from the top of smart phone 110 to the bottom of smart phone 110. The marking remains on the left side of the smart phone because the vehicle 104 has remained to the left of occupant vehicle 102. Vehicle 'B' 106 has remained in essentially the same position with respect to the occupant vehicle 102, and therefore the corresponding marketing 'B' on smart phone 110 remains unchanged compared to that within FIG. 1. Vehicle 108 is now closer to occupant vehicle 102, and therefore corresponding marking 'C' on the smart phone 110 is now longer, thus indicating a corresponding change in condition.

Figure 3:
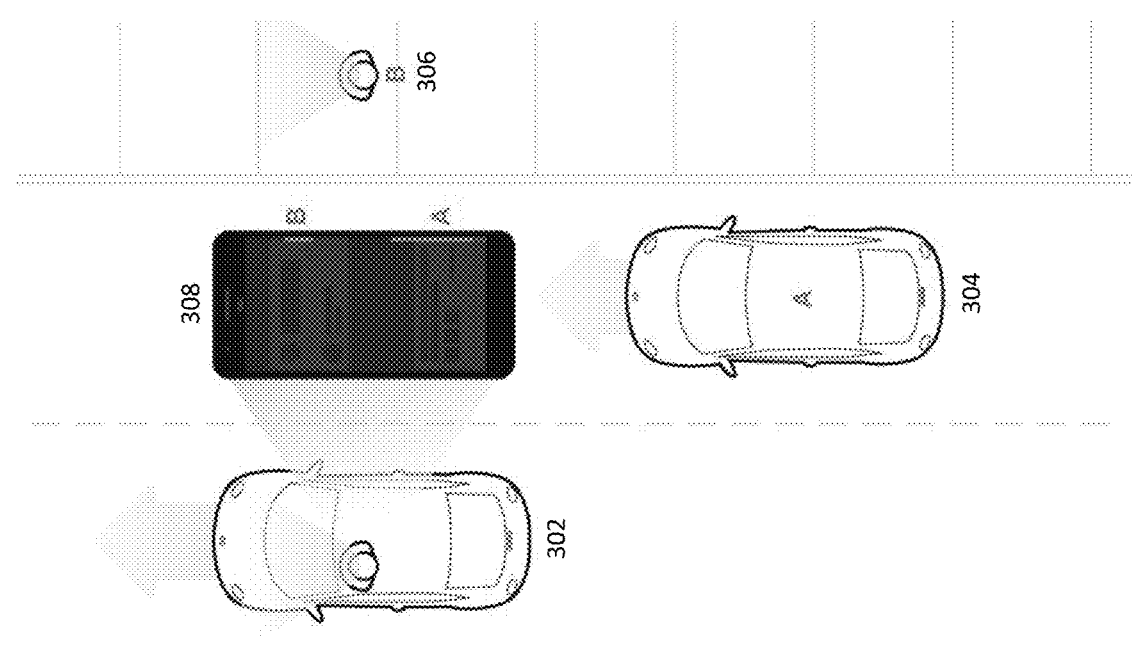
FIG. 3 shows an example of vehicle surroundings depiction with a vehicle and a pedestrian.

FIG. 3 shows an example of vehicle surroundings depiction with a vehicle and a pedestrian, according to an aspect of the disclosure. In this example, vehicle 302 is traveling in the left lane of a roadway, while vehicle 304 is traveling in an adjacent right lane. Pedestrian 306 is present on a sidewalk in the general vicinity. An occupant of vehicle 302 is using smart phone 308. Smart phone 308 displays two markings 'A' and 'B', which indicate the presence of vehicle 304 and pedestrian 306, respectively. Both markings are on the right outer edge of the smart phone 308, indicating that both vehicle 304 and pedestrian 306 are located to a right side of vehicle 302. Marking 'A' is longer than marking 'B', which, depending on the configuration, may indicate an a closer proximity of vehicle 304 compared to pedestrian 306, and increased velocity of vehicle 304 compared to pedestrian 306, or otherwise. Determination of the lengths, thicknesses, colors, patterns, or movement of the markings may be achieved in ways that will be described herein.

Figure 4:
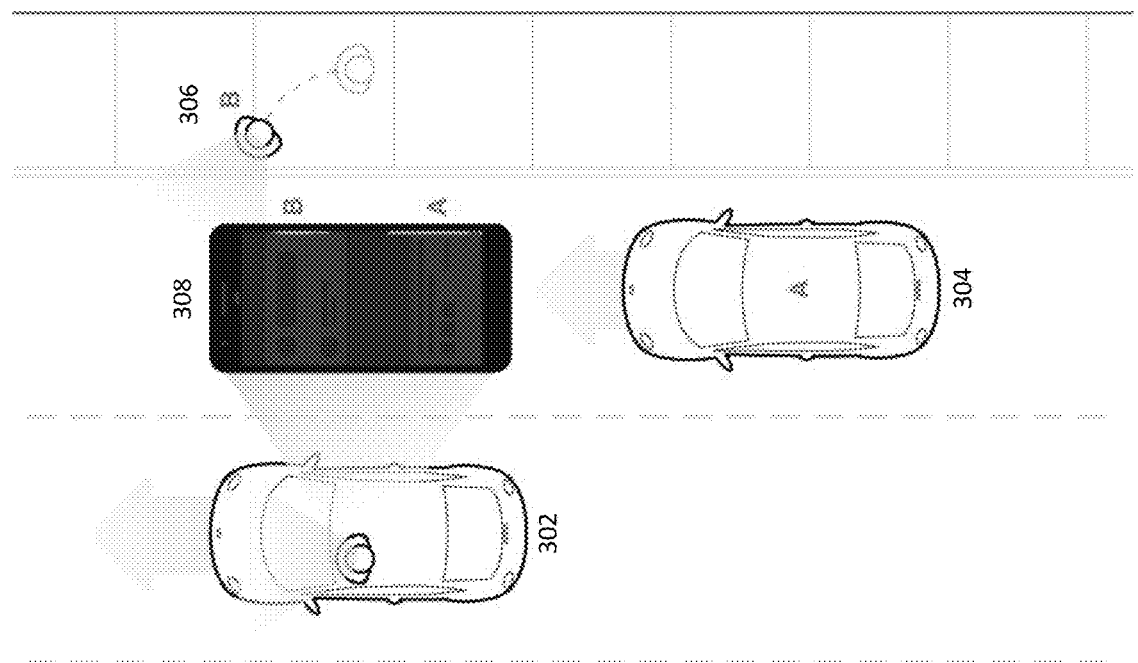
FIG. 4 displays a criticality notification, according to an aspect of the disclosure.

FIG. 4 displays a criticality notification, according to an aspect of the disclosure. In this figure, pedestrian 306 has taken a sudden turn to the left, such that it appears that pedestrian 306 will exit the pedestrian walkway and enter a lane of traffic. Because a pedestrian is believed to be entering a lane of traffic in a vicinity of vehicle 302, and therefore a collision between the pedestrian and the vehicle is of greater risk, the pedestrian is evaluated as having a high level of criticality. In this case, marking 'B' on smart phone 308 has increased in length. In addition, the marking may change color to indicate an increase in criticality. Any colors whatsoever may be used. For example, a noncritical marking may be displayed as green, whereas a critical marking may be displayed as orange or red. Any colors whatsoever may be selected to indicate an increase in criticality.

Figure 5C:
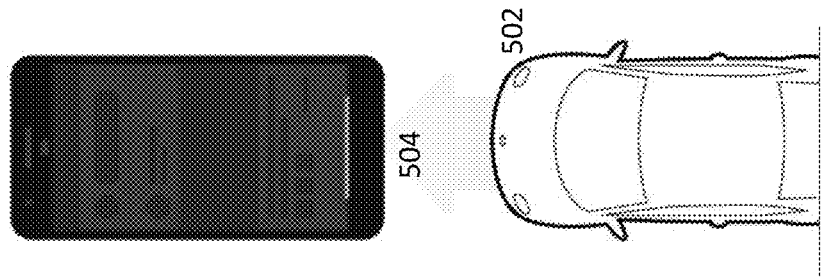
FIG. 5A through 5C depict changes in marking due a change in proximity.
Figure 5B:
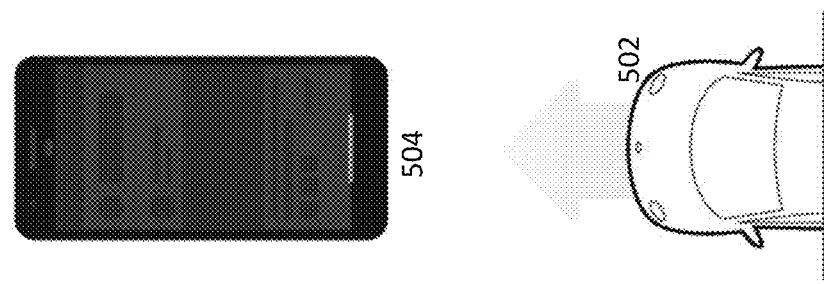
Figure 5A:
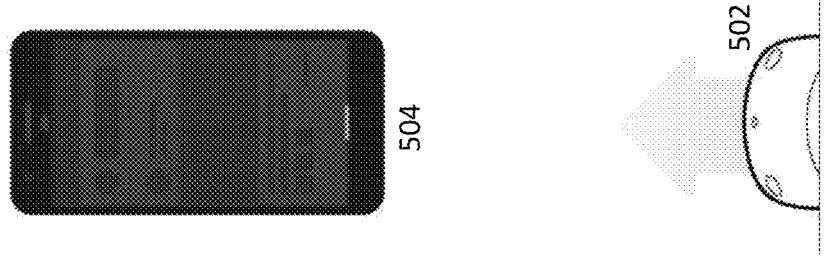

FIGS. 5A through 5C indicate a change in marking due a change in proximity. In these figures vehicle 502 is approaching a vehicle containing smart phone 504. A marking corresponding to vehicle 502 is present at a bottom portion of the smart phone display. The selection of the bottom portion of the smart phone display indicates that the vehicle is approaching from behind. In this manner, the bottom portion of the display corresponds to obstacles behind the AGV; the top part of the display corresponds to obstacles in front of the AGV; the left part of the display corresponds to obstacles to the left of the AGV; and the right portion of the screen corresponds to obstacles to the right the AGV.

In FIG. 5A, a significant distance is present between vehicle 502 and the vehicle containing smart phone 504, and therefore the corresponding marking is small. FIG. 5B depicts a reduced distance between vehicle 502 and the vehicle containing smart phone 504, such as, for example, when vehicle 502 accelerates or is otherwise traveling at a faster velocity than the vehicle containing smart phone 504. To indicate the reduced distance, the marking on smart phone 504 has increased in size. FIG. 5C indicates a yet further reduced proximity between vehicle 502 and the vehicle containing smart phone 504. In this case, the distance is greatly reduced, and the corresponding marking on smart phone 504 has increased in size to indicate a reduced distance.

Figure 6A:
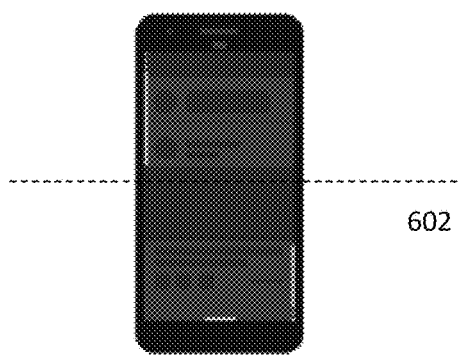
FIG. 6A through 6C display the surroundings notifications for various positions relative to the vehicle.
Figure 6B:
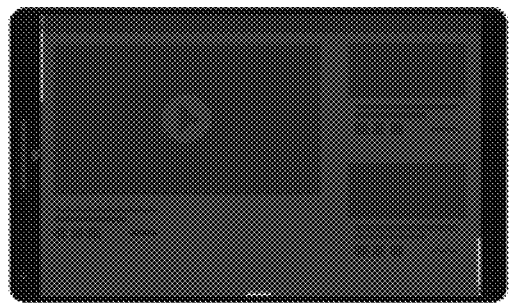
Figure 6C:
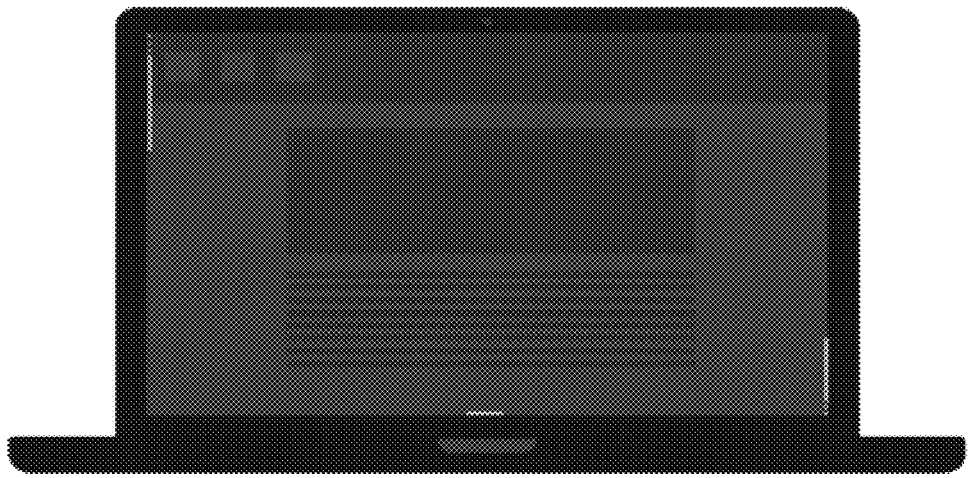

FIGS. 6A-6C display the surroundings notifications for an obstacle ahead of and to the left of the vehicle, an obstacle behind the vehicle, and an obstacle behind and to the right of the vehicle, according to various aspects of the disclosure. FIG. 6A depicts a conventional smart phone in a vertical orientation. Imaginary horizontal line 602 bisects the smart phone into an upper half and a lower half. Obstacles in front of the AGV (regardless of whether directly in front, in front and to the left, or in front and to the right) appear in the upper half (above 602), and obstacles behind the AGV (whether directly behind, behind and to the left, or behind into the right) appear in the lower half (below 602). An obstacle directly adjacent to the vehicle (and therefore neither ahead of the vehicle nor behind the vehicle) will be indicated by a marking on a corresponding left or right side of the smart phone screen, along the bisecting line 602.

FIG. 6B depicts the same traffic configuration as in 6A on a device turned in a landscape orientation. In order to simplify user understanding of the surroundings notifications, the orientation of the notification markings may be changed to reflect an orientation of the device. That is, markings on the left side of the device in a first orientation will appear on a left side of the device in the second orientation. Similarly, markings on a bottom of the device in a first orientation will appear on the bottom of the device in a second orientation, and so on. As in FIG. 6A, and despite the change into landscape orientation, FIG. 6B continues to depict an obstacle ahead of and to the left of the vehicle, an obstacle behind the vehicle, and an obstacle behind into the right of the vehicle.

FIG. 6C depicts the same traffic configuration as in FIG. 6A and FIG. 6B displayed on the laptop. It is anticipated that the surroundings markings described herein may be displayed on any device with a screen or display without limitation. Such devices may include, but are not limited to, a smart phone, a tablet computer, a laptop, a portable gaming system, a portable television, a vehicle display, or a vehicle entertainment system.

FIG. 7A-7D show adjustments to the orientation of the markings based on an orientation of the device, according to various aspects of the disclosure. As previously described, the markings are placed on the screen of the device in such an orientation as to indicate a position of the obstacle relative to the vehicle. Accordingly, a line on the left side of the device indicates an obstacle on the left side of the vehicle; a line on the right side of the device indicates an obstacle on the right side of the vehicle, and so on. Where the device changes between a portrait orientation and a landscape orientation, the markings may also rotate or be adjusted such that the relationship between the obstacle and the vehicle continues to be reflected on the screen after a change in orientation. That is, an obstacle to the left of the vehicle will be shown on the left side of the screen before a change in orientation, and will continue to be shown on the left side of the screen after a change in orientation. Otherwise explained, the markings will be rotated to correspond with a rotation of the device during a change in orientation.

Figure 7A:
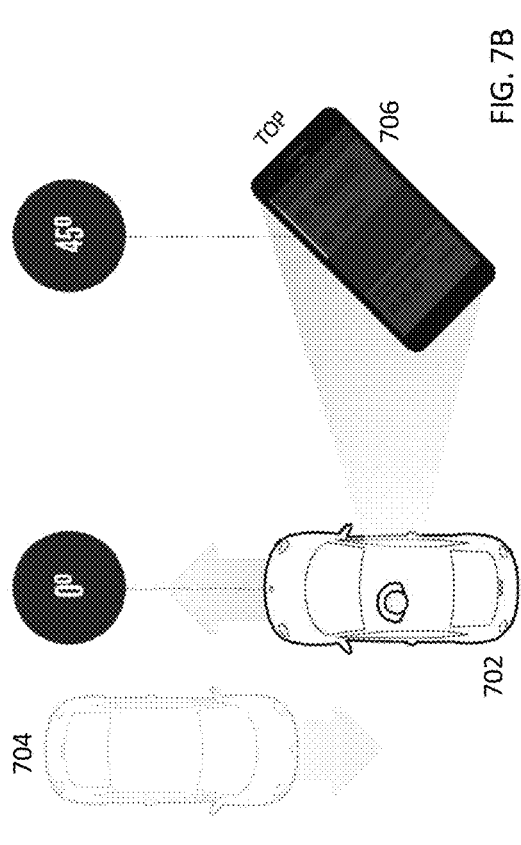
FIG. 7A through 7D show adjustments to the orientation of the markings based on an orientation of the device.
Figure 7B:
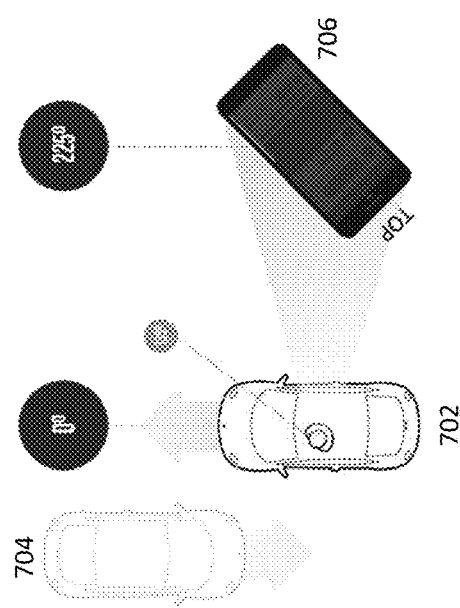
Figure 7C:
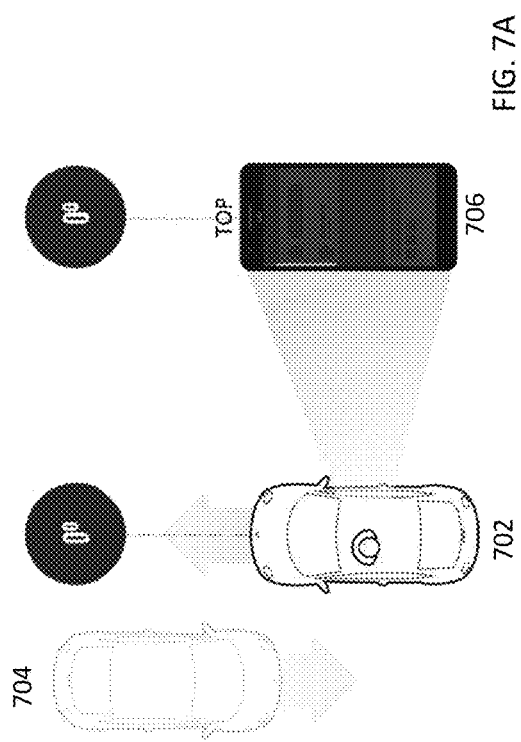
Figure 7D:
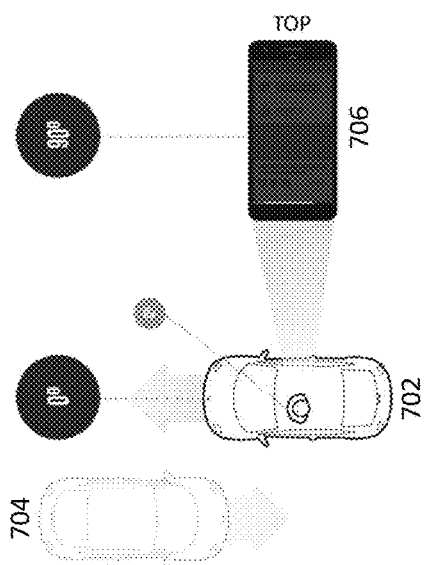

In the context of the vehicle, however, where there may be few, if any, flat workspaces on which to position a display, it is anticipated that the display may be rotated to an angle that neither corresponds with a portrait orientation nor a landscape orientation. That is, if a portrait orientation corresponds to 0° or 180°, and if a landscape orientation corresponds with 90° or 270°, it is anticipated that a user may orient the device at an angle between 0° and 90°, at an angle between 90° and 180°, at an angle between 180° and 270°, or at an angle between 270° and 360°. In these cases, it is desirable to present the information in a manner that is easiest for the occupant to associate with obstacles in a vicinity of the vehicle. As such, and according to one aspect of the disclosure, the markings may be depicted in accordance with the orientation (whether landscape or portrait) to which the display is closest. As such, the 45° angle, the 135° angle, the 225° angle, and the 315° angle are deciding angles, such that a device between 315° and 45° may display the markings in a portrait orientation; a device between 45° and 135° may display the markings in a landscape orientation; a display between 135° and 225° may display the markings in a portrait orientation; and a display between 225° and 315° may display the markings in a landscape orientation. In accordance with the foregoing, FIG. 7A depicts a set of markings on smart phone 706 for vehicle 702 with respect to vehicle 704 in a portrait orientation. FIG. 7B depicts smart phone 706 being rotated in a direction of approaching 45° and maintaining the portrait orientation. FIG. 7C depicts smart phone 706 at a 90° orientation, and thus in landscape mode. FIG. 7D depicts smart phone 706 approaching a rotation of 225° and maintaining a portrait orientation.

Figure 8:
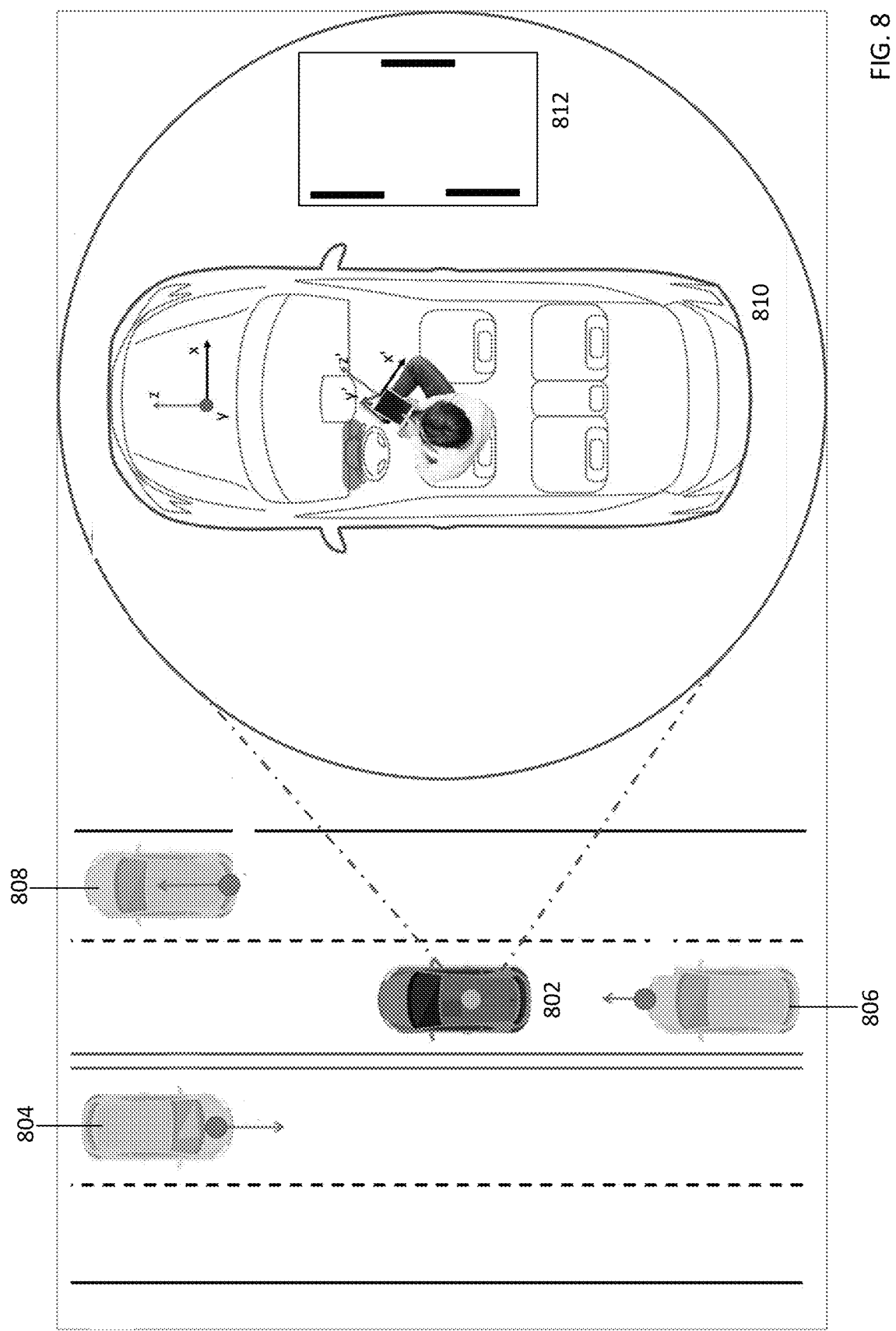
FIG. 8 depicts a modification of the marking orientation within a three-dimensional space.

FIG. 8 depicts a modification of the marking orientation within a three-dimensional space. In addition to the rotation which is described in FIG. 6A-6D, and which may be considered a roll movement, it is anticipated that the display may also undergo a yaw movement within the vehicle. A yaw movement may also require a change in orientation. FIG. 8 shows an AGV 802 in the leftmost lane of a road in a first direction, wherein vehicle 804 is traveling toward vehicle 802 in the leftmost lane in the opposite direction; vehicle 806 is traveling behind vehicle 802 in the same lane; and vehicle 808 is traveling ahead of vehicle 802 in an adjacent lane. For demonstrative purposes, it is assumed that the occupant inside vehicle 802 turns completely to the occupant's right, such that the occupant is facing the passenger's side door. Assuming that the passenger holds the screen in front of him in a normal fashion, the screen will have undergone a 90° yaw movement to the right. In this orientation, the left side of the screen will correspond to the front of the vehicle; the right side of the screen will correspond to the rear of the vehicle; the front of the screen will correspond to the right side of the vehicle; and the bottom of the screen will correspond to the left side of the vehicle. A marking depiction of vehicles 804 806 and 808 are depicted on screen 812.

Figure 9:
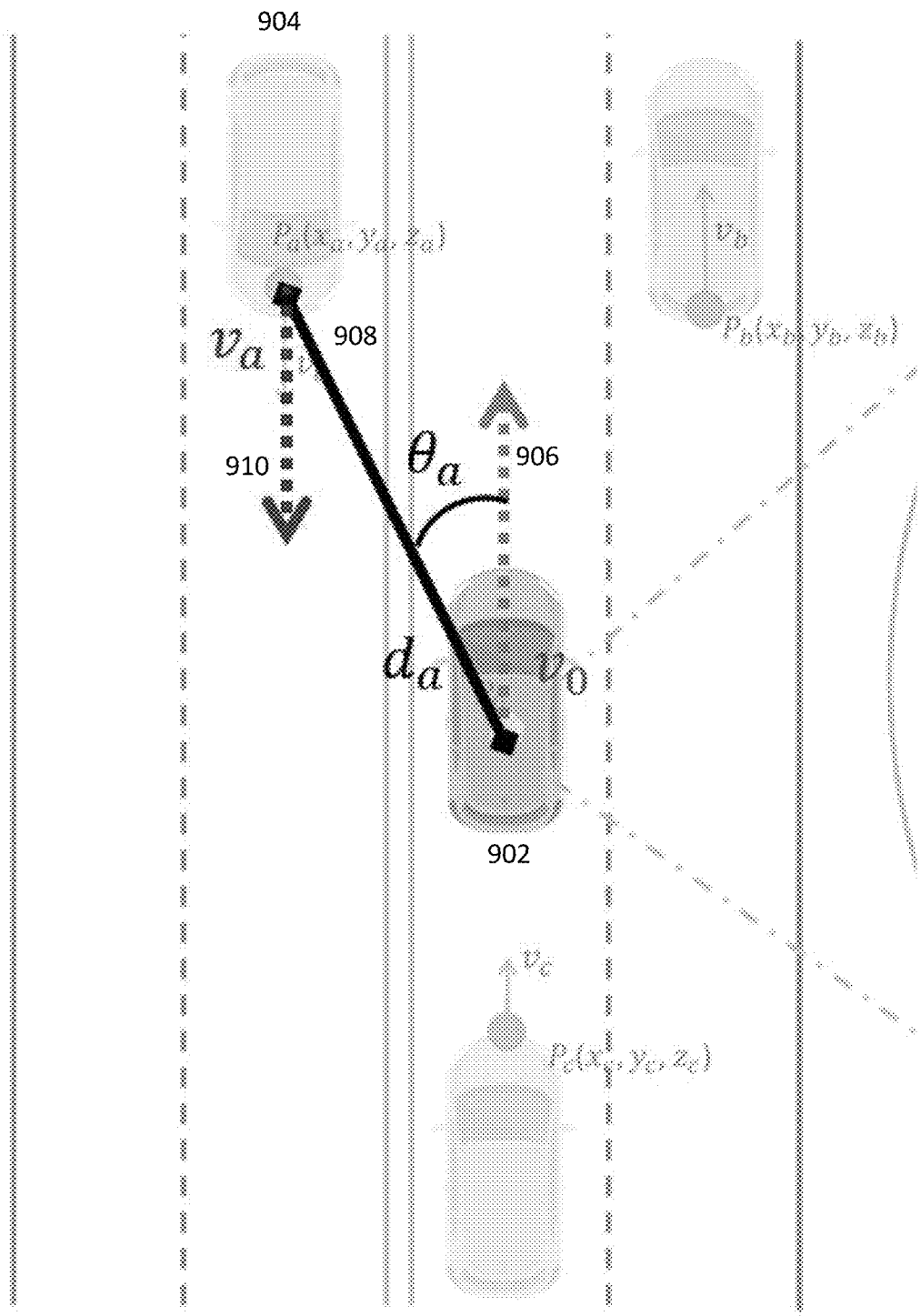
FIG. 9 shows a calculation of vehicle angles according to an aspect of the disclosure.

FIG. 9 shows a calculation of vehicle angles according to an aspect of the disclosure. In this figure, AGV 902 is driving opposite and in an adjacent lane to AGV 904. Vehicle 902 is traveling along a path indicated by the velocity arrow 906. Vehicle 904 is traveling in a path indicated by arrow 910. A line corresponding to a point of each vehicle is depicted as 908. An angle between the trajectory of vehicle 902 and the vehicle 908 (theta) may be calculated as described herein. A theta of 0° indicates that the vehicles are traveling along the same direction.

Figure 10:
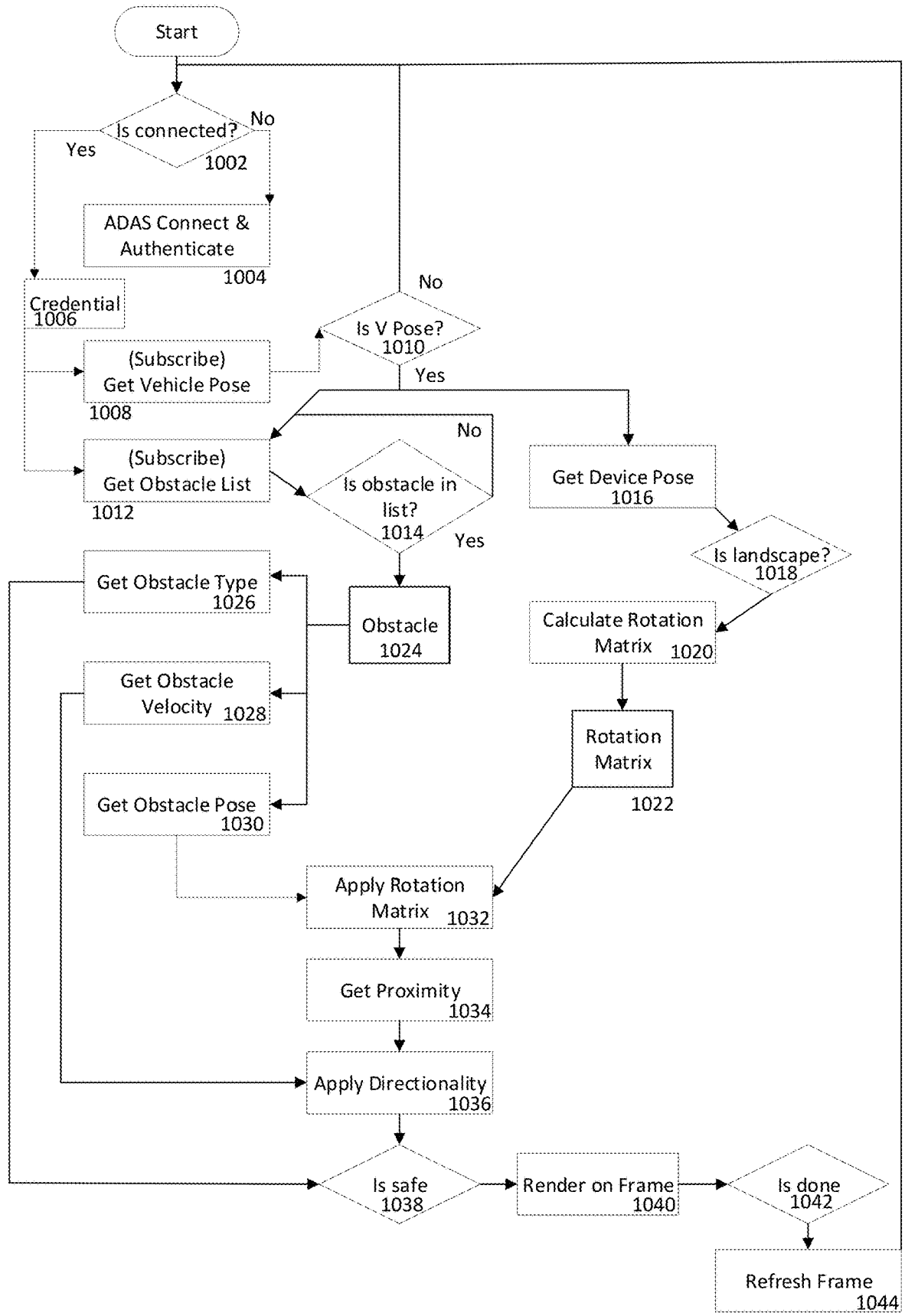
FIG. 10 shows a decision chart for the methods and devices disclosed herein.

FIG. 10 shows a decision chart for the methods and devices disclosed herein, according to an aspect of the disclosure. The procedures described herein require information regarding vehicles within a vicinity of the AGV. This information can come from any source whatsoever, including, but not limited to an AGV driving system, and advanced driver assistance system, a V2V system, or any other data source whatsoever. Whatever the data source used, it is first determined whether the system performing the methods herein is connected to the source of vehicle information 1002. If the connection has not been established, then the connection must be established and authenticated 1004. If the connection exists, then any necessary credentialing is performed 1006, and vehicle pose information 1008 and a vehicle obstacle list 1012 are received. Assuming that a vehicle pose is detected 1010, a device pose 1016 is also obtained. It is determined whether the device pose is in a specific orientation 1018, and then whether any rotational matrix is necessary to resolve the orientation 1020. If so, the rotational matrix is determined 1022 and applied 1032. In addition, it is determined whether any obstacle is within the obstacle list 1014. If so, the obstacle is identified 1024, and the obstacle type is obtained 1026, as well as the obstacle velocity 1028 and the obstacle pose 1030. The rotational matrix 1032 is applied to both the obstacle pose and the display orientation. A proximity of the obstacle 1034 is obtained, as well as directionality 1036 and based on these factors, it is determined whether the vehicle poses a safety risk 1038. Based on these factors, a rendering on the display is determined 1040, and once this is complete 1042, the frame is refreshed 1044.

Figure 11:
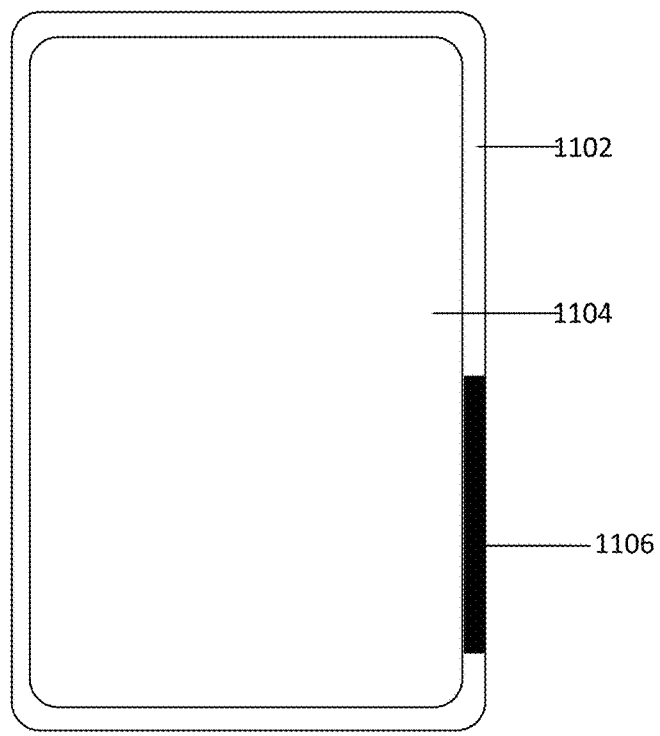
FIG. 11 depicts a display according to a first aspect of the disclosure.

FIG. 11 depicts a display according to a first aspect of the disclosure. The display is separated into an outer region 1102 and an inner region 1104. User content is displayed in the inner region 1104. The user content may be any user content whatsoever, including but not limited to applications, social media, websites, streaming video, or otherwise. Whatever the source of user content, the user content will be viewable within the inner region 1104. The outer region 1102 is reserved for depictions of the vehicle surroundings 1106 as described herein. The outer region 1102 may be any number of pixels wide, such as a band of one or more than one pixel, a band of three or more than three pixels, a band of five or more than five pixels, or otherwise.

According to one aspect, the user content may be reduced in size to occupy the inner region 1104 without occupying the outer region 1102.

Figure 12:
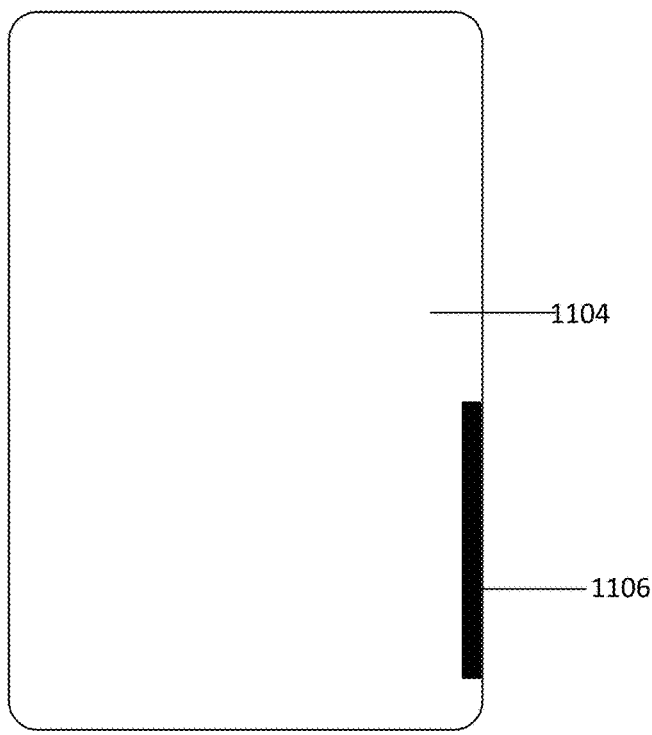
FIG. 12 depicts a display according to a second aspect of the disclosure.

As shown in FIG. 12, and according to another aspect of the disclosure, the user content may not be reduced in size, and may be viewable within the inner region 1102, but the outer region 1104 may be reserved for depictions of the vehicle surroundings 1106, and therefore user content may not be viewable within the outer region 1102. In this configuration, an outer portion of the user content would not be viewable. In this configuration, the one or more processors or the display controller may not display the user content within the outer region 1102. Alternatively, the one or more processors or the display controller may overlay a band, such as a black band, over the user content, within the outer region 1102. In this manner, a portion of the user content would be viewable within the inner region 1104 but not within the outer region 1102.

FIG. 11 depicts a display according to a second aspect of the disclosure. According to this aspect of the disclosure, the user content is available on the display 1104, and the depictions of the vehicle surroundings 1106 are depicted on an outer edge of the screen. The entirety of the user content is viewable along the entirety of the display, other than areas on which depictions of the vehicle surroundings 1106 are present. In this configuration, the one or more processors or the display controller overlay depictions of the vehicle surroundings 1106 on top of the user content.

Figure 13:
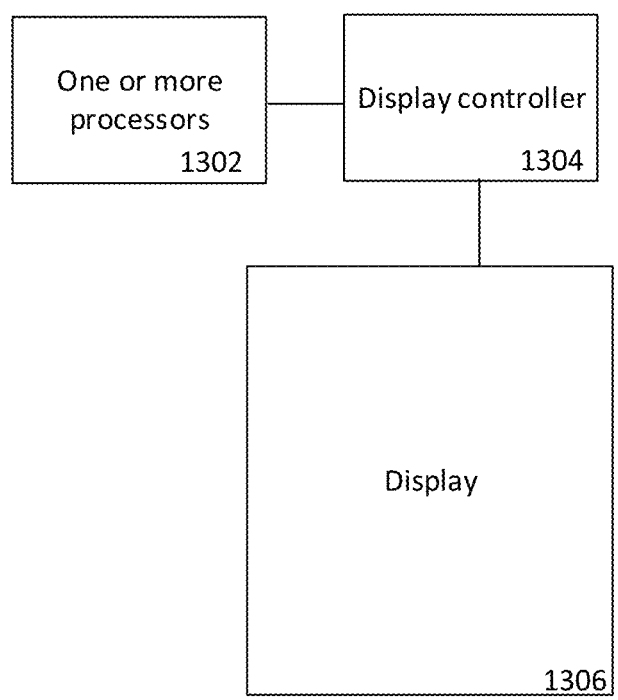
FIG. 13 depicts a vehicle surroundings depiction system according to an aspect of the disclosure.

FIG. 13 depicts a vehicle surroundings depiction system according to an aspect of the disclosure comprising one or more processors 1302 configured to receive data representing one or more parameters of an obstacle relative to a vehicle; generate a visual representation of the one or more parameters; and instruct a display controller 1304 to display a composite image, the composite image comprising a content image within an inner region of a display and the visual representation within an outer region of the display 1306; and the display controller, configured to display the composite image.

Figure 14:
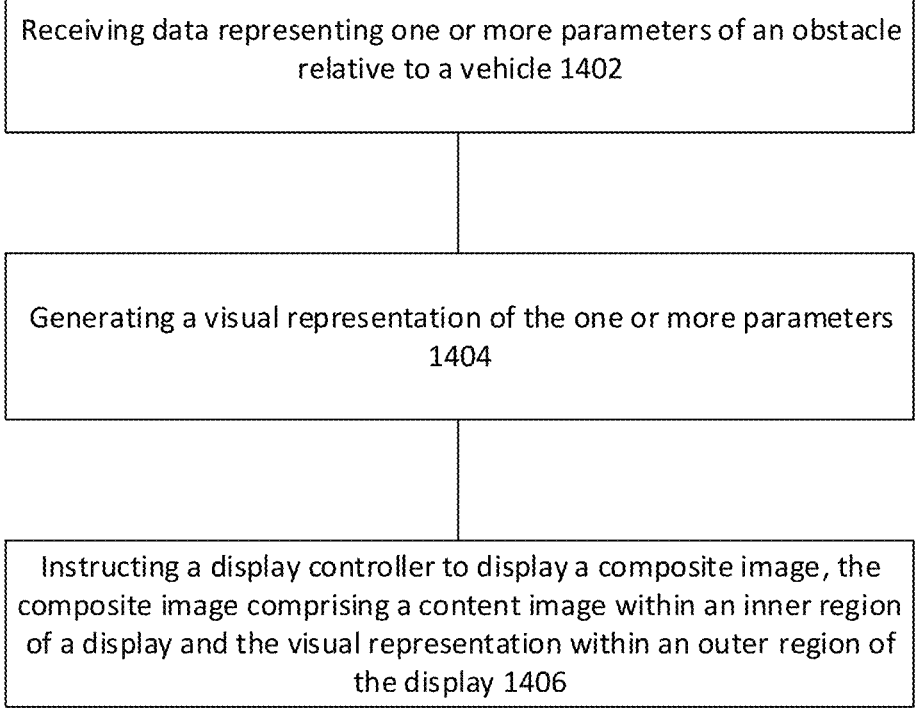
FIG. 14 depicts a method of vehicle surroundings depiction.

FIG. 14 depicts a method of vehicle surroundings depiction comprising receiving data representing one or more parameters of an obstacle relative to a vehicle 1402; generating a visual representation of the one or more parameters 1404; and instructing a display controller to display a composite image, the composite image comprising a content image within an inner region of a display and the visual representation within an outer region of the display 1406.

Partial or full automation in driving can lead to a lack of awareness of vehicle occupants with respect to the vehicle's surroundings. Such a reduction in contextual or spatial awareness may be especially dangerous in automation levels 3 and below, where vehicle automated control might need to be passed to a human operator.

In periods where an occupant is not tasked with a driving responsibility, the vehicle occupant will likely be engaged in secondary activities on vehicle screens or personal electronic devices, such as smartphones. To counteract the resulting loss of contextual or spatial awareness, a proximal peripheral visual information frame it is presented, such that the frame is embedded in the occupant's screen to provide context-awareness of the vehicle surroundings while driving. It is anticipated that such a visual information frame will help vehicle occupants maintain vehicle context-awareness while they are engaged in secondary activities.

Situation awareness is critical in the decision making process needed for driving safely. Vehicle sensor technology has been added over the years to increase the driver's capability for safe driving. Driver assist automation technology is now increasingly assuming driving tasks from a human driver. Commercially available automated driving vehicles are considered Society of Automation Engineers ("SAE") Levels 1 to Level 3, which performed various levels of driver assistance, such as Lane Keeping Assist or Automatic Cruise Control. Vehicles operating at these levels expect drivers to be fully engaged in vehicle control tasks. However driver distraction is still the highest cause of accidents on the road, at least partially due to in-vehicle infotainment systems and smartphone use while driving. Driver distraction is especially problematic among the digitally native population (16-24) and has become the leading cause of death worldwide among young people despite increasing bans on the use of smartphones while driving and use restrictions imposed on vehicles.

Fully automated vehicles (SAE Level 4) are being tested on roads carrying highly trained safety drivers. However these operators are not immune to driver distraction. Even during AGV operations, vehicle passengers have a responsibility to maintain situational awareness. Accordingly, herein is disclosed a method to maintain situational awareness on a display by using proximal peripheral light signals embedded on the screen in a context-awareness frame. This solution may be used with any screen in use in the vehicle whatsoever, whether part of the vehicle infotainment system or a personal device.

Most electronic devices such as smartphones have built in detection of car state and communication with the vehicle via Bluetooth. This existing connectivity between mobile devices and vehicles can be used to create a solution to improve vehicle occupant contextual and spatial awareness of a vehicle's outer vicinity.

Disclosed herein is a "driving context-awareness frame", which may be a visual frame of any number of pixels in width (such as 1 pixel wide, 3 pixels wide, 5 pixels wide, or otherwise) that is reserved in the border of the screen of use of the vehicle occupant. The frame may be integrated in the invehicle infotainment screens or in a personal device (smartphone, tablet, laptop, virtual reality headset, or otherwise).

According to one aspect of the disclosure, the context-awareness frame may receive information from the vehicle sensors (radar, lidar, camera or others) and display the corresponding surrounding obstacle information in the frame providing real-time situational awareness to the user while the user consumes content on the screen.

The context-awareness frame can provide passive information or active warnings to the user in collaboration with the rest of the in-vehicle infotainment systems for proper alerts. The methods and systems disclosed herein include a method and system to provide vehicular contextual awareness to a vehicle passenger engaged in a task on a screen during driving via a peripheral spatial context awareness embedded within the frame. This is achieved at least via a component called a Context-Awareness Frame App ("CAFA"), which controls a visual frame reserved on the border of the screen and communicates with the vehicle driving system, such as the Advance Driver Assistance System ("ADAS"), to receive obstacle data and transforms the observed obstacles to a rendering visualization on the frame. The obstacle data may include position data, velocity, acceleration, or any other data related to the obstacle.

The CAFA may be a software program, which includes a set of instructions to cause one or more processors to perform the steps described herein. The frame may be any size, including a frame having a width of one or more pixels, three or more than three pixels, five or more than five pixels, or any other number of pixels. This visual frame rendering presents the relative location of obstacles around the vehicle in real time so that dynamic moving obstacles will appear on the frame and move across the frame as they are perceived by the vehicle exterior facing sensor suite (radar, lidar, camera, etc.).

The device on which the CAFA software solution runs is connected to the vehicle system through a wireless or wired connection that allows the real-time transmission of obstacles. The connect may be any connection whatsoever, including, but not limited to, Bluetooth, Wi-Fi, or USB. The CAFA software transforms the obstacle associated metadata (for example type, location, velocity delta with respect to vehicle) to a visual pattern that is displayed on the periphery of the user's center of focus, supporting a continuous feedback of vehicle context awareness. In some implementations, the device management access and the CAFA can be part of the in-vehicle infotainment system which could present the CAFA software on an in-vehicle screen such as the rear seat infotainment or other screen in the vehicle. In other implementations, the solution may be embedded into a consumer device such as a laptop, tablet, or smartphone. The CAFA software can be part of a user application of a system level application incorporated into the operating system of the device (for example, Windows, OSX, Android, Linux). In another implementation, the device discoverability and connectivity may be enforced by standardized communication protocols such as the existing Bluetooth protocols for pairing smartphones and exchanging media files. Other implementations might include integration with a driver/vehicle occupant monitoring systems which can enhance the CAFA system by providing user's head orientation/gaze orientation to further optimize CAFA rendering attributes.

As previously shown in FIG. 6A-6C, the CAFA system is integrated with the vehicle ADAS system, and the integrated information, such as, for example, the vehicle state and obstacle state are translated into a visual representation in the device's reference frame and render. The CAFA software receives as information input the metadata associated with the list of objects perceived by the vehicle sensor suite. This collection of objects can be, for example, obtained from the object fusion layer of an ADAS software stack or can be received directly from an intelligent ADAS sensor (e.g. Mobileye camera) through CAN message subscription. Typical information contained on the detected object metadata package may include object id, classification, position & orientation (object pose) and velocity vector. The system also collects the AGV position and orientation (pose) and its own velocity vector and compares it with the device's pose to apply the appropriate transformations.

As described in FIG. 8, at any given point the user's screen orientation might differ from the vehicle orientation, $(x',y',z') \neq (x,y,z)$, wherein $(x,y,z)$ represent the orientation of the vehicle, and $(x',y',z')$ represent the orientation of the device. Thus upon receiving the vehicle pose, the CAFA must calculate the rotation matrix to align the external context representation as perceived by the vehicle with the device orientation such as $$[x',y',z'] = R*[x,y,z] \tag{1}$$

This rotation might happen within three-dimensional space (e.g. in the case of a handheld smartphone, which may be freely turned by a user). According to one aspect of the disclosure, the velocity vector from both devices may be used (since both user and vehicle would be moving in the same direction) to calculate the orientation angle differences, and then the user Euler angles for the rotation matrix may be applied, where a rotation $\phi$ about the x-axis is first performed, followed by a rotation about the y-axis and a rotation $\psi$ about the momentary z-axis with the resulting alignment of the device frame of reference with the vehicle. Alternatively, and depending on the orientation of the device and the relevant plane, the $\phi$ may be rotated about the z-axis.

$$R = \text{Euler}(\phi, \vartheta, \psi) = R(x, \phi) * R(y'', \vartheta) * R(z'', \psi) = \tag{2}$$

$$\begin{pmatrix} \cos\phi & -\sin\phi & 0 \\ \sin\phi & \cos\phi & 0 \\ 0 & 0 & 1 \end{pmatrix} \begin{pmatrix} \cos\vartheta & 0 & \sin\vartheta \\ 0 & 1 & 0 \\ -\sin\vartheta & 0 & \cos\vartheta \end{pmatrix} \begin{pmatrix} \cos\psi & -\sin\psi & 0 \\ \sin\psi & \cos\psi & 0 \\ 0 & 0 & 1 \end{pmatrix} =$$

$$\begin{pmatrix} \cos\phi\cos\vartheta\cos\psi - \sin\phi\cos\psi & -\cos\phi\cos\vartheta\sin\psi - \sin\phi\cos\psi & \cos\phi\sin\vartheta \\ \sin\phi\cos\vartheta\cos\psi + \cos\phi\sin\psi & -\sin\phi\cos\vartheta\cos\psi + \cos\phi\cos\psi & \sin\phi\cos\vartheta \\ -\sin\vartheta\cos\psi & \sin\vartheta\sin\psi & \cos\vartheta \end{pmatrix}$$

The obstacle position can be obtained from the ADAS obstacle metadata and may be correlated with the vehicle position using the distance formula. This may be achieved, for example, based on a distance between vehicles, such as for example vehicle 902 and vehicle 904 as depicted in FIG. 9. With respect to these vehicles, FIG. 9 details velocity vectors and distance between an AGV and an obstacle vehicle:

$$d_a = \sqrt{(x_a - x_o)^2 + (y_a - y_o)^2 + (z_a - z_o)^2} \tag{3}$$

By comparing the velocity vector of the obstacle and the vehicle, it can be inferred whether an obstacle is approaching the AGV or distancing itself from the autonomous vehicle, or whether the obstacle and the autonomous vehicle are traveling in a parallel trajectory. With respect to FIG. 9, the angle $\phi a$ between the vehicle velocity vector va and the autonomous-vehicle velocity vector v0 can be calculated as:

$$\phi a = \cos^{-1} \frac{v_a * v_0}{|v_a| * |v_0|} \tag{4}$$

If $\phi a = 0$, then the two obstacles are in a parallel trajectory, which indicates that the objects are not on a collision path, and indicates a measure of safety.

According to another aspect of the disclosure, these computations may be performed directly by the ADAS system itself, thus reducing computational requirements on the CAFA software. In this implementation, the ADAS may be programmed to perform the computations as described herein and deliver the resulting data to the CAFA for device display.

Obstacles may be represented by light indicators that move along the frame in accordance with their movement in the real world. The movement may be depicted according to the velocity vector updates received by the vehicle sensors. Device orientation, such as portrait or landscape, is taken into consideration by the CAFA software to maintain a user's frame of reference according to the particular use of the device, such as when the user holds the device in an upright orientation for typing an email and re-orients the device to a horizontal orientation for watching a video.

Once an obstacle it is no longer in the vicinity of the vehicle, it will be depicted as exiting the frame on the display. The exiting will take place with a directionality corresponding to the direction of movement relative to the vehicle. According to one aspect of the disclosure, brightness can be used to apply a "fade-out" effect for obstacles leaving the region of interest of the vehicle, such as, for example, in a divergent trajectory such as moving away from the vehicle.

Objects surrounding the AGV can be at different distances. Altering the length of the object in the context awareness frame indicates changes of the object distance relative to the AGV. The screen depiction of the obstacle may include color coding to convey additional information. According to one aspect of the disclosure, obstacles may be depicted with color to indicate a level of safety. For example, obstacles at a safe distance or following a safe trajectory may be depicted as being green, and obstacles at an unsafe distance or following an unsafe trajectory may be depicted using a contrasting color, or a color indicating danger, such as orange or red. The person skilled in the art will recognize that any color combination may be selected, and the implementations are not limited to the examples described herein as green, orange, and red. According to another aspect of the disclosure, brightness, or alterations in brightness, may be used to indicate changes in proximity, levels of danger, or any other factor. For example, an obstacle increasing in proximity may be depicted with a flashing or pulsating pattern. To further illustrate, the pedestrian in FIG. 3 who abruptly changed his/her trajectory when crossing the road, may be depicted with a change in color, such as a change from green to orange, or a change in brightness, such as being presented as a solid line to a pulsating line.

The one or more processors may be configured to calculate a rotation matrix between the vehicle and user device and apply a translation operation for every vehicle, taking into consideration the device orientation with respect to the vehicle orientation. In performing this operation, it may be desirable to take into consideration various design implementations to improve user awareness. First, when the screen is tilted in an angle less than 90° with respect to vehicle, it may display obstacles according to the vehicle's orientation. Second, when the device is tilted at 90°, it will change to landscape mode, and thus the frame of reference will be rotated for the device with support for small angle variations. When the device is rotated more than 180°, the user might be using the screen while sitting opposite the vehicle's direction of motion. In this case, it may be desired to convey to the user the context-events using the user's own frame of reference rather than a frame of reference corresponding to the vehicle. This may improve the user's ability to perceive the vehicle's surroundings and thus better assume control and/or driving responsibilities.

Without limitation, the data representing one or more parameters of an obstacle relative to a vehicle may be received at least by any one or more sensors, by one or more processors which directly or indirectly receive data from one or more sensors, by an autonomous driving circuit, or a advanced driver assistance system. The data may include obstacle position, obstacle proximity, obstacle velocity, obstacle acceleration, and/or data representing any of these parameters. Alternatively or additionally, the data may include a change in trajectory of an obstacle and/or a criticality of an obstacle trajectory.

Raw data as measured from one or more sensors may require further analysis to determine one or more of the above parameters, such as further analysis to evaluate a proximity to the AGV, or an obstacle trajectory relative to the AGV. Such further analysis may be performed by any one or more processors including, but not limited to, one or more processors within the AGV, one or more processors located externally to the AGV, one or more processors within the advanced driver assistance system, or one or more processors device comprising the display on which the composite image is shown.

The visual representation of the one or more parameters may be determined based on one or more configurations or settings. The visual representation may include a line or line segment, a length, brightness, pattern, color, location on the screen, direction, or velocity of movement may be selected to depict one or more of the above parameters. For example, and according to one aspect of the disclosure, a length of the line or line segment may be selected based on a proximity to the AGV, such that a longer line segment corresponds to a closer proximity, and a smaller line segment corresponds to a greater distance from the AGV.

The line segment may be depicted as moving in a direction corresponding with the movement of the obstacle. That is, the line segment may move along an edge of the screen in a direction corresponding with a movement of the obstacle relative to the vehicle. This direction may be modified, as described herein, to accommodate an orientation of the user device relative to the vehicle.

The line segment may be depicted with one or more patterns, such as a trailing end, a dashed or dotted body, or otherwise. Such patterns may be ascribed any parameter without limitation, including but not limited to, changes in acceleration, changes in velocity, or otherwise.

The line segment may be depicted with one or more colors, or with a change of color. According to one aspect of the disclosure, the color may indicate a criticality or danger of the obstacle. For example, an obstacle that is moving in a trajectory parallel to the vehicle, or an obstacle moving away from a vehicle, may be depicted with a color associated with safety, such as green or blue. Conversely, an obstacle that is moving in a trajectory toward the vehicle may be depicted in a color associated with danger, such as orange or red. Alternatively or additionally, a color may be selected to indicate a criticality, such as a likelihood of imminent danger, or a predicted severity of danger from a likely impact.

The line segment may be depicted with various thicknesses. The thickness of the line segment may be selected to indicate any parameter whatsoever, whether directionality, criticality, velocity, proximity, acceleration, or otherwise. According to one aspect of the disclosure, the thickness of the line segment may be selected to indicate a mass or size of the obstacle, which may be associated with a potential for injury or harm resulting from a collision.

The line segment may be depicted with variations in brightness, such as changing from dim to bright or bright to dim, or by being displayed in a blinking or pulsating manner. Such changes in brightness may indicate any parameter whatsoever including, but not limited to, changes in directionality, changes in acceleration, changes in velocity, a change in criticality, or otherwise.

The visual representation may be depicted as part of a composite image. That is, because it is anticipated that a user may view a screen, such as on a mobile device or an infotainment system, it is anticipated that the screen will display a form of user content. Thus, the one or more processors may be configured, whether directly, or through a display controller, to cause a composite picture to be displayed on the screen, wherein the composite image comprises the visual representation of the one or more parameters as depicted along one or more outer edges of the screen, and the user content display within an inner portion of the screen. According to a first aspect of the disclosure, a selected number of pixels forming an outer frame of the screen may be dedicated for depiction of the visual representation, and the remaining screen area within the outer frame may be dedicated for user content. According to a second aspect of the disclosure, the entire screen may be dedicated to user content, with the one or more processors or a display controller overlaying the visual representations on top of the user content, such that the visual representations are displayed on a region corresponding to the outer frame but over the user content.

The one or more processors may be configured to determine one or more relational factors relating to the one or more parameters. The one or more relational factors may include, but are not limited to, obstacle directionality, obstacle proximity, or obstacle criticality. That is, the one or more processors may receive sensor data including or related to one of the above parameters, and from said sensor data may calculate a relational factor such as directionality, proximity, or criticality.

The composite image may be modified based on an orientation of the display. According to one aspect of the disclosure, the composite image may be rotated according to an orientation of the display, such as whether the displays in a portrait or landscape orientation. For example, assuming a default of a portrait orientation, wherein a length of the display corresponds to a length of the vehicle, a rotation of the display 90° clockwise into a landscape orientation may trigger a rotation of the composite image by 90° clockwise, or a rotation of the display 90° counterclockwise into a landscape orientation may trigger a rotation of the composite image by 90° counterclockwise. In the landscape orientation, a length of the display may correspond to a width of the vehicle, and a width of the display may correspond to the length of the vehicle.

The one or more visual representations may be rotated or modified to accommodate an orientation of the display relative to a direction of travel of the vehicle. This may be desired in situations such as when a yaw of the display is changed such as a yaw rotation by 90°. Such a yaw rotation may correspond to, for example, a vehicle occupant rotating by 90° within the vehicle occupant's seat. In such a yaw rotation, the screen positions corresponding to regions of the vehicle may differ. For example, in a yaw rotation of 90°, the left vertical side of the screen may correspond to the front of the vehicle; the right vertical portion of the screen may correspond to the rear of the vehicle; the top horizontal portion of the screen may correspond to the right of the vehicle; and the bottom horizontal portion of the screen may correspond to the left of the vehicle. In the event of a yard rotation of 90° counterclockwise, these positions would be reversed.

The visual representations may be depicted along one or more outer edges of the display. The thickness of the area of visual representation depiction may be selected based on any criterion. According to one aspect of the disclosure, the outer region of the display for visual representation depiction may be one pixel, three or more pixels, five or more pixels, or otherwise.

Further, various embodiments will be described in the following:

In Example 1, a set of instructions is disclosed, configured to cause one or more processors to receive data representing one or more parameters of an obstacle relative to a vehicle; generate a visual representation of the one or more parameters; and instruct a display controller to display a composite image, the composite image comprising a content image within an inner region of a display and the visual representation within an outer region of the display.

In Example 2, the set of instructions of Example 1 is disclosed, wherein the one or more parameters comprises at least one of obstacle position, object velocity, object acceleration, or object direction.

In Example 3, the set of instructions of Example 1 or 2 is disclosed, wherein generating the visual representation comprises generating a line segment is disclosed, wherein at least one of a length, thickness, color, or pattern of the line segment corresponds to one or the one or more parameters.

In Example 4, the set of instructions of any one of Examples 1 to 3 is disclosed, wherein generating a visual representation comprises determining from the one or more parameters one or more relational factors is disclosed, wherein the one or more relational factors comprise obstacle directionality, obstacle proximity, or obstacle criticality.

In Example 5, the set of instructions of Example 4 is disclosed, wherein generating the visual representation comprises determining at least one of a length, a color, a thickness, or a pattern of the visual representation based a relational factor.

In Example 6, the set of instructions of Example 4 or 5 is disclosed, further comprising modifying the line segment based on a change in a relational factor.

In Example 7, the set of instructions of any one of Examples 1 to 6 is disclosed, wherein displaying the composite image comprises determining an orientation of the display, and rotating the visual representation relative to the display.

In Example 8, the set of instructions of any one of Examples 1 to 7 is disclosed, wherein the set of instructions is further configured to rotate the visual representation based on an orientation of the display relative to a direction of travel of the vehicle.

In Example 9, the set of instructions of any one of Examples 1 to 8 is disclosed, wherein the set of instructions is further configured to rotate the visual representation based on a portrait or landscape orientation of the screen.

In Example 10, the set of instructions of any one of Examples 1 to 9 is disclosed, wherein instructing the display controller further comprises determining a rotational matrix based on an orientation of the display with respect to the vehicle, and modifying the visual representation by the rotational matrix.

In Example 11, the set of instructions of any one of Examples 1 to 10 is disclosed, wherein the outer region comprises at least a row of pixels along an edge of the display.

In Example 12, the set of instructions of any one of Examples 1 to 11 is disclosed, wherein the outer region comprises at least a row of pixels along a perimeter of the display.

In Example 13, the set of instructions of any one of Examples 1 to 12 is disclosed, wherein the outer region comprises at least three rows of pixels along a perimeter of the display.

In Example 14, the set of instructions of any one of Examples 1 to 13 is disclosed, wherein the content image is an image of user content.

In Example 15, the set of instructions of any one of Examples 1 to 14 is disclosed, wherein the data representing one or more parameters is received from an autonomous vehicle.

In Example 16, the set of instructions of any one of Examples 1 to 15 is disclosed, wherein the data representing one or more parameters is received from an advanced driver assistance system.

In Example 17, a vehicle surroundings depiction system is disclosed, comprising one or more processors configured to receive data representing one or more parameters of an obstacle relative to a vehicle; generate a visual representation of the one or more parameters; and instruct a display controller to display a composite image, the composite image comprising a content image within an inner region of a display and the visual representation within an outer region of the display; and the display controller, configured to display the composite image.

In Example 18, the vehicle surroundings depiction system of Example 17 is disclosed, wherein the one or more parameters comprises at least one of obstacle position, object velocity, object acceleration, or object direction.

In Example 19, the vehicle surroundings depiction system of Example 17 or 18 is disclosed, wherein generating the visual representation comprises generating a line segment is disclosed, wherein at least one of a length, thickness, color, or pattern of the line segment corresponds to one or the one or more parameters.

In Example 20, the vehicle surroundings depiction system of any one of Examples 17 to 19 is disclosed, wherein generating a visual representation comprises determining from the one or more parameters one or more relational factors is disclosed, wherein the one or more relational factors comprise obstacle directionality, obstacle proximity, or obstacle criticality.

In Example 21, the vehicle surroundings depiction system of Example 20 is disclosed, wherein generating the visual representation comprises determining at least one of a length, a color, a thickness, or a pattern of the visual representation based a relational factor.

In Example 22, the vehicle surroundings depiction system of Example 20 or 21 is disclosed, further comprising modifying the line segment based on a change in a relational factor.

In Example 23, the vehicle surroundings depiction system of any one of Examples 17 to 22 is disclosed, wherein displaying the composite image comprises determining an orientation of the display, and rotating the visual representation relative to the display.

In Example 24, the vehicle surroundings depiction system of any one of Examples 17 to 23 is disclosed, wherein the one or more processors are further configured to rotate the visual representation based on an orientation of the display relative to a direction of travel of the vehicle.

In Example 25, the vehicle surroundings depiction system of any one of Examples 17 to 24 is disclosed, wherein the one or more processors are further configured to rotate the visual representation based on a portrait or landscape orientation of the screen.

In Example 26, the vehicle surroundings depiction system of any one of Examples 17 to 25 is disclosed, wherein instructing the display controller further comprises determining a rotational matrix based on an orientation of the display with respect to the vehicle, and modifying the visual representation by the rotational matrix.

In Example 27, the vehicle surroundings depiction system of any one of Examples 17 to 26 is disclosed, wherein the outer region comprises at least a row of pixels along an edge of the display.

In Example 28, the vehicle surroundings depiction system of any one of Examples 17 to 27 is disclosed, wherein the outer region comprises at least a row of pixels along a perimeter of the display.

In Example 29, the vehicle surroundings depiction system of any one of Examples 17 to 28 is disclosed, wherein the outer region comprises at least three rows of pixels along a perimeter of the display.

In Example 30, the vehicle surroundings depiction system of any one of Examples 17 to 28 is disclosed, wherein the content image is an image of user content.

In Example 31, a method of vehicle surroundings depiction is disclosed comprising receiving data representing one or more parameters of an obstacle relative to a vehicle; generating a visual representation of the one or more parameters; and instructing a display controller to display a composite image, the composite image comprising a content image within an inner region of a display and the visual representation within an outer region of the display.

In Example 32, the method of vehicle surroundings depiction of Example 31 is disclosed, wherein the one or more parameters comprises at least one of obstacle position, object velocity, object acceleration, or object direction.

In Example 33, the method of vehicle surroundings depiction of Example 31 or 32 is disclosed, wherein generating the visual representation comprises generating a line segment is disclosed, wherein at least one of a length, thickness, color, or pattern of the line segment corresponds to one or the one or more parameters.

In Example 34, the method of vehicle surroundings depiction of any one of Examples 31 to 33 is disclosed, wherein generating a visual representation comprises determining from the one or more parameters one or more relational factors is disclosed, wherein the one or more relational factors comprise obstacle directionality, obstacle proximity, or obstacle criticality.

In Example 35, the method of vehicle surroundings depiction of Example 34 is disclosed, wherein generating the visual representation comprises determining at least one of a length, a color, a thickness, or a pattern of the visual representation based a relational factor.

In Example 36, the method of vehicle surroundings depiction of Example 34 or 35 is disclosed, further comprising modifying the line segment based on a change in a relational factor.

In Example 37, the method of vehicle surroundings depiction of any one of Examples 31 to 36 is disclosed, wherein displaying the composite image comprises determining an orientation of the display, and rotating the visual representation relative to the display.

In Example 38, the method of vehicle surroundings depiction of any one of Examples 31 to 37 is disclosed, further comprising rotating the visual representation based on an orientation of the display relative to a direction of travel of the vehicle.

In Example 39, the method of vehicle surroundings depiction of any one of Examples 31 to 38 is disclosed, further comprising rotating the visual representation based on a portrait or landscape orientation of the screen.

In Example 40, the method of vehicle surroundings depiction of any one of Examples 31 to 39 is disclosed, wherein instructing the display controller comprises determining a rotational matrix based on an orientation of the display with respect to the vehicle, and modifying the visual representation by the rotational matrix.

In Example 41, the method of vehicle surroundings depiction of any one of Examples 31 to 40 is disclosed, wherein the outer region comprises at least a row of pixels along an edge of the display.

In Example 42, the method of vehicle surroundings depiction of any one of Examples 31 to 31 is disclosed, wherein the outer region comprises at least a row of pixels along a perimeter of the display.

In Example 43, the method of vehicle surroundings depiction of any one of Examples 31 to 42 is disclosed, wherein the outer region comprises at least three rows of pixels along a perimeter of the display.

In Example 44, the method of vehicle surroundings depiction of any one of Examples 31 to 43 is disclosed, wherein the content image is an image of user content.

In Example 45, the method of vehicle surroundings depiction of any one of Examples 31 to 44 is disclosed, wherein the data representing one or more parameters is received from an autonomous vehicle.

In Example 46, the method of vehicle surroundings depiction of any one of Examples 31 to 45 is disclosed, wherein the data representing one or more parameters is received from an advanced driver assistance system.

In Example 47, a means of depicting vehicle surroundings is disclosed comprising one or more processing means configured to receive data representing one or more parameters of an obstacle relative to a vehicle; generate a visual representation of the one or more parameters; and instruct a display controlling means to display a composite image, the composite image comprising a content image within an inner region of a display and the visual representation within an outer region of the display; and the display controlling means, configured to display the composite image.

In Example 48, a non-transient computer readable medium configured to caused one or more processors to perform the method of any one of Examples 31 to 46.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A non-transitory computer readable medium comprising instructions, which, if executed, are configured to cause a processor to:
receive data representing a parameter of an obstacle comprising an obstacle position relative to a vehicle;
generate a visual representation of the parameter; and
instruct a display controller to continuously display a composite image within a display of a mobile device, the composite image comprising a content image within an inner region of the display and the visual representation within a portion of an outer region of the display, wherein the outer region continuously corresponds to vehicle surroundings of the entire vehicle;
wherein the display controller is configured to:
continuously display the composite image;
determine an angle of the display relative to the obstacle; and
rotate the visual representation based on the angle of the display relative to the obstacle, wherein the visual representation is displayed in:
a landscape orientation when the angle of the display is equal to 45 degrees or between 45 degrees and 135 degrees;
the landscape orientation when the angle of the display is equal to 225 degrees or between 225 degrees and 315 degrees;
a portrait orientation when the angle of the display is between 135 degrees and 225 degrees; and
the portrait orientation when the angle of the display is between 315 degrees and 45 degrees;
wherein the portion of the outer region is selected relative to the inner region to continuously represent the obstacle position relative to the vehicle and the vehicle surroundings and the content image comprises user content that corresponds to a secondary activity of a driver of the vehicle.

2. The non-transitory computer readable medium of claim 1, wherein the parameter comprises at least one of obstacle position, object velocity, object acceleration, or object direction.

3. The non-transitory computer readable medium of claim 1, wherein generating the visual representation comprises generating a line segment, wherein at least one of a length, thickness, color, or pattern of the line segment corresponds to the parameter.

4. The non-transitory computer readable medium of claim 1, wherein generating a visual representation comprises determining from the parameter a relational factor, wherein the relational factor comprises obstacle directionality, obstacle proximity, or obstacle criticality.

5. The non-transitory computer readable medium of claim 1, wherein displaying the composite image comprises determining an orientation of the display, and rotating the visual representation relative to the display.

6. The non-transitory computer readable medium of claim 1, wherein the set of instructions is further configured to rotate the visual representation based on an orientation of the display relative to a direction of travel of the vehicle.

7. The non-transitory computer readable medium of claim 1, wherein instructing the display controller further comprises determining a rotational matrix based on an orientation of the display with respect to the vehicle, and modifying the visual representation by the rotational matrix.

8. The non-transitory computer readable medium of claim 1, wherein the outer region comprises a row of pixels along an edge of the display.

9. A vehicle surroundings depiction system comprising:
a processor configured to:
receive data representing a parameter of an obstacle including an obstacle position relative to a vehicle;
generate a visual representation of the parameter; and
instruct a display controller to continuously display a composite image within a display of a mobile device, the composite image comprising a content image within an inner region of the display and the visual representation within a portion of an outer region of the display, wherein the outer region corresponds to the vehicle surroundings of the entire vehicle; and
the display controller is configured to:
continuously display the composite image;

determine an angle of the display relative to the obstacle; and rotate the visual representation based on the angle of the display relative to the obstacle, wherein the visual representation is displayed in:

a landscape orientation when the angle of the display is equal to 45 degrees or between 45 degrees and 135 degrees;

the landscape orientation when the angle of the display is equal to 225 degrees or between 225 degrees and 315 degrees;

a portrait orientation when the angle of the display is between 135 degrees and 225 degrees; and the portrait orientation when the angle of the display is between 315 degrees and 45 degrees;

wherein the processor is configured to select the portion of the outer region relative to the inner region to continuously represent the obstacle position relative to the vehicle and the vehicle surroundings and the content image comprises user content that corresponds to a secondary activity of a driver of the vehicle.

10. The vehicle surroundings depiction system of claim 9, wherein the parameter comprises at least one of obstacle position, object velocity, object acceleration, or object direction.

11. The vehicle surroundings depiction system of claim 9, wherein generating a visual representation comprises determining from the parameter a relational factor, wherein the relational factor comprises obstacle directionality, obstacle proximity, or obstacle criticality and wherein generating the visual representation comprises determining at least one of a length, a color, a thickness, or a pattern of the visual representation based a relational factor.

12. The vehicle surroundings depiction system of claim 9, wherein displaying the composite image comprises determining an orientation of the display and rotating the visual representation relative to the display.

13. A method of vehicle surroundings depiction comprising:

receiving data representing a parameter of an obstacle relative to a vehicle;

generating a visual representation of the parameter; and instructing a display controller to continuously display a composite image within a display of a mobile device, the composite image comprising a content image within an inner region of the display and the visual representation within an outer region of the display, wherein the outer region continuously corresponds to vehicle surroundings of the entire vehicle; and wherein the display controller is configured to:

continuously display the composite image;

determine an angle of the display relative to the obstacle; and rotate the visual representation based on the angle of the display relative to the obstacle, wherein the visual representation is displayed in:

a landscape orientation when the angle of the display is equal to 45 degrees or between 45 degrees and 135 degrees;

the landscape orientation when the angle of the display is equal to 225 degrees or between 225 degrees and 315 degrees;

a portrait orientation when the angle of the display is between 135 degrees and 225 degrees; and the portrait orientation when the angle of the display is between 315 degrees and 45 degrees;

wherein the portion of the outer region is selected relative to the inner region to continuously represent the obstacle position relative to the vehicle and the vehicle surroundings and the content image comprises user content that corresponds to a secondary activity of a driver of the vehicle.

14. The method of vehicle surroundings depiction of claim 13, wherein generating a visual representation comprises determining from the parameter a relational factor, wherein the relational factor comprises obstacle directionality, obstacle proximity, or obstacle criticality.

15. The method of vehicle surroundings depiction of claim 13, wherein displaying the composite image comprises determining an orientation of the display, and rotating the visual representation relative to the display.

16. The method of vehicle surroundings depiction of claim 13, wherein instructing the display controller comprises determining a rotational matrix based on an orientation of the display with respect to the vehicle, and modifying the visual representation by the rotational matrix.

17. The non-transitory computer readable medium of claim 1, wherein the parameter of the obstacle further comprises a proximity of the obstacle relative to the vehicle, and wherein the instructions are further configured to cause the processor to determine a visual representation length representing the proximity of the obstacle relative to the vehicle, and to instruct the display controller to display the visual representation at the visual representation length.

18. The non-transitory computer readable medium of claim 17, wherein the parameter of the obstacle further comprises a change in proximity of the obstacle relative to the vehicle, and wherein the instructions are further configured to cause the processor to determine an altered visual representation length representing the change in proximity of the obstacle relative to the vehicle, and to instruct the display controller to display the visual representation at the changed visual representation length.

19. The non-transitory computer readable medium of claim 1, wherein the parameter of the obstacle further comprises a change in the obstacle position relative to the vehicle, and wherein the instructions are further configured to cause the processor to determine a second portion of the outer region, different from the portion of the outer region, and to instruct the display controller to display the visual representation at the second portion of the outer region; wherein the second portion of the outer region is selected such that a difference between the portion of the outer region and the second portion of the outer region represents the change in the obstacle position relative to the vehicle.

* * * * *